(12) United States Patent
Okuda

(10) Patent No.: US 6,453,397 B1
(45) Date of Patent: Sep. 17, 2002

(54) SINGLE CHIP MICROCOMPUTER INTERNALLY INCLUDING A FLASH MEMORY

(75) Inventor: Ikutaro Okuda, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/460,623

(22) Filed: Dec. 14, 1999

(30) Foreign Application Priority Data

Dec. 14, 1998 (JP) .......................................... 10-354198

(51) Int. Cl.[7] .............................................. G06F 12/00
(52) U.S. Cl. ........................ 711/163; 711/103; 711/156; 711/170; 712/37
(58) Field of Search ................................. 711/102, 103, 711/163, 137, 156, 170; 712/37, 247, 248; 713/2, 193, 600, 601, 100; 714/42, 710, 718

(56) References Cited

U.S. PATENT DOCUMENTS

| | | | | |
|---|---|---|---|---|
| 5,293,424 A | * | 3/1994 | Holtey et al. | 713/193 |
| 5,442,704 A | * | 8/1995 | Holtey | 711/163 |
| 5,644,781 A | * | 7/1997 | Hagimori | 712/37 |
| 5,682,027 A | * | 10/1997 | Bertina et al. | 235/380 |
| 5,687,345 A | * | 11/1997 | Matsubara et al. | 711/103 |
| 5,771,191 A | * | 6/1998 | Matsue | 365/185.09 |
| 5,828,911 A | * | 10/1998 | Miyazawa | 396/236 |
| 5,881,295 A | * | 3/1999 | Iwata | 710/262 |
| 5,905,921 A | * | 5/1999 | Miyazawa | 396/300 |
| 5,923,838 A | * | 7/1999 | Hongo | 714/42 |
| 5,974,528 A | * | 10/1999 | Tsai et al. | 712/37 |
| 6,038,635 A | * | 3/2000 | Ideta | 711/103 |
| 6,075,941 A | * | 6/2000 | Itoh et al. | 717/4 |

FOREIGN PATENT DOCUMENTS

| | | |
|---|---|---|
| JP | 62-165253 | 7/1987 |
| JP | 64-43897 | 2/1989 |
| JP | 4-17477 | 3/1992 |
| JP | 5-266219 | 10/1993 |
| JP | 10-111863 | 4/1998 |
| JP | 10-134586 | 5/1998 |
| JP | 10-143434 | 5/1998 |

OTHER PUBLICATIONS

Japanese Office Action issued Oct. 31, 2000 in a related application with English translation of relevant portions.

* cited by examiner

*Primary Examiner*—David Hudspeth
*Assistant Examiner*—Fred F. Tzeng
(74) *Attorney, Agent, or Firm*—Dickstein, Shapiro, Morin & Oshinsky, LLP

(57) ABSTRACT

A single chip microcomputer 1 internally includes a flash memory 2, a communication port 5, a CPU 4, an internal ROM 3, and a programming control circuit 6. The flash memory 2 includes, as a paired area, a first area A for storing a program, and a second area B for indicating a write inhibition flag, a read inhibition flag and an erase inhibition flag, which are management information for managing the first area A. When the CPU receives a programming request from an external device, the CPU refers to the management information stored in the second area B to determine whether or not a programming of the first area A should be executed. Thus, the single chip microcomputer can easily manage the writing, reading and erasing to the flash memory provided with a security measure, and on the other hand, can have a security of the degree sufficient to protect the copy right.

14 Claims, 4 Drawing Sheets

SINGLE CHIP MICROCOMPUTER INTERNALLY INCLUDING A FLASH MEMORY

BACKGROUND OF THE INVENTION

The present invention relates to a single chip microcomputer internally including a flash memory.

A single chip microcomputer internally including a microprocessor and a flash memory both formed on a single chip (called simply a "single chip microcomputer" hereinafter) is used at present. Now, a prior art single chip microcomputer will be described with reference to FIG. 1. The shown single chip microcomputer, generally designated by the reference number 1, internally includes a flash memory 2, a communication port 5, a CPU. (central processing unit) 4, an internal ROM (read only memory) 3, and a programming control circuit 6, which are coupled through an internal bus as shown in FIG. 1.

The flash memory 2 includes an internal area, which is divided into arbitrary areas (A or B), which are managed independently of each other, so that a writing, a reading and a flash erasing can be carried out in units of one divided area.

The communication port 5 is connected to an external write device (not shown) which is external of the flash memory 2, for transferring various information including a write data and a dedicated command between the flash memory 2 and the external device.

The CPU 4 manages the whole of the single chip microcomputer 1, and executes a processing based on a program included in the internal ROM 3 or the flash memory 2.

The internal ROM 3 previously stores a communication algorithm 9 which describes the procedure for transferring information through the communication port 5, and a programming algorithm 8 which describes the procedure for performing the writing and the erasing to an arbitrary area in the flash memory 2.

The programming control circuit 6 is controlled by the CPU 4 to execute the actual writing, reading and erasing to the flash memory 2.

In the single chip microcomputer 1, if a dedicated command is inputted from the write device in an operation mode dedicated for the programming, the CPU 4 controls the programming control circuit 6 in accordance with the procedure described in the programming algorithm 8, so that the writing, the reading or the flash erasing is executed for the arbitrary area in the flash memory 2.

As mentioned above, in the prior art single chip microcomputer 1, the programmed operation such as the writing the reading and the erasing for an arbitrary area in the flash memory 2. is unlimitedly executed by the dedicated command. Therefore, the write device has all authority for executing the programmed operation. In other words, no security for information in the flash memory 2 is considered. Therefore, a program already stored in the internal flash memory can be analyzed or modified by an unauthorized person, and accordingly, a copy right of software cannot be protected.

Japanese Patent Application Pre-examination Publication No. JP-A-04-017477 (an English abstract of JP-A-04-017477 is available and the content of the English abstract of JP-A-04-017477 is incorporated by reference in its entirety into this application) proposes a technology for controlling a so-called IC card or smart cart. FIG. 2 is a block diagram showing the construction of the 1C disclosed in JP-A-04-017477.

The IC card, generally designated by the reference number 20, includes a microcomputer 21, which comprises an internal memory 25. This internal memory 25 is previously written with a basic processing program such as a communication program to communicate within terminal device 28 and an external memory 22 through a bus, a check program for checking whether or not information is correct when the communication is performed, and a secret protecting program including a pass word. Furthermore, the microcomputer 21 includes a CPU for executing a necessary processing in accordance with a program stored in the internal memory 25 or the like, and an interface 23.

The external memory 22 provided in parallel to the microcomputer 22, is constituted of a PROM (programmable ROM), and includes a user program area 26 which can be freely written by a program used for a processing required by a user. and a data area 27 which can be written with necessary data.

The internal memory 25 is previously written with an address of the user program 26 in the external memory 22, and a heading address and an ending address of the data area 27. Therefore, when the loading of the user program is completed, the ending address of the user program area 26 is written with a mark which indicates the completion of the writing of the user program.

Therefore, inhibition of a re-loading of the user program to the user program area 26 is checked on the basis of whether or not there exists the mark which indicates the completion of the writing of the user program. On the other hand, inhibition of writing and reading to the data area 27 is realized by preparing a pass word function, a code checking, and encryption, in the user program area 26, in the form of a program.

However, JP-A-04-017477 merely describes a general IPL (initial program loader) function, which is already practiced in an early personal computer. But, JP-A-04-017477 does not disclose a data handling manner and a processing means, for security necessary for protecting the copy right.

When the external memory 22 is constituted of an EEPROM (electrically erasable PROM), it becomes possible to erase in units of a block. However, the above mentioned microcomputer does not describe an electrically erasing at all.

BRIEF SUMMARY OF THE INVENTION

Accordingly, it is an object of the present invention to provide a single chip microcomputer which has overcome the above mentioned problems of the prior art.

Another object of the present invention is to provide a single chip microcomputer capable of easily managing the writing, reading and erasing to the flash memory provided with a security means, and on the other hand, having a security of the degree sufficient to protect the copy right.

The above and other objects of the present invention are achieved in accordance with the present invention by a single chip microcomputer internally including a microprocessor and a flash memory both formed on a single chip, wherein the flash memory includes a first area, and a second area for designating whether or not it is permissible to program the first area, and wherein when the microprocessor receives a programming request from an external device, the microprocessor refers to the second area to determine whether or not a programming of the first area should be executed.

With the above mentioned arrangement, by referring to a write inhibition flag, a read inhibition flag and an erase inhibition flag, which are management information for managing the first area, it is possible to easily perform a management of the first area in the flash memory, such as permission and inhibition of the writing, reading and erasing to the flash memory.

In one embodiment of the single chip microcomputer, when the microprocessor has executed the programming of the first area, the microprocessor writes an instruction of inhibiting the programming of the first area, into the second area.

With this arrangement, from the view point of protecting the copy right of a software and of ensuring a security of the system, it is possible to voluntarily inhibit an intentional programming (including the writing, reading and erasing) to the flash memory.

Preferably, the single chip microcomputer further internally includes a read only memory which stores a programming algorithm for determining whether or not execution of the programming is permissible, and the microprocessor is controlled in accordance with the algorithm stored in the read only memory to refer to the second area.

Alternatively, the single chip microcomputer further internally includes a read only memory which stores a loader program for loading a programming algorithm for determining whether or not execution of the programming is permissible, from an external device to an internal memory, and the microprocessor is controlled in accordance with the programming algorithm stored in the internal memory to refer to the second area.

The above and other objects, features and advantages of the present invention will be apparent from the following description of preferred embodiments of the invention with reference to the accompanying drawings.

DETAILED DESCRIPTION OF THE INVENTION

Figure 1:
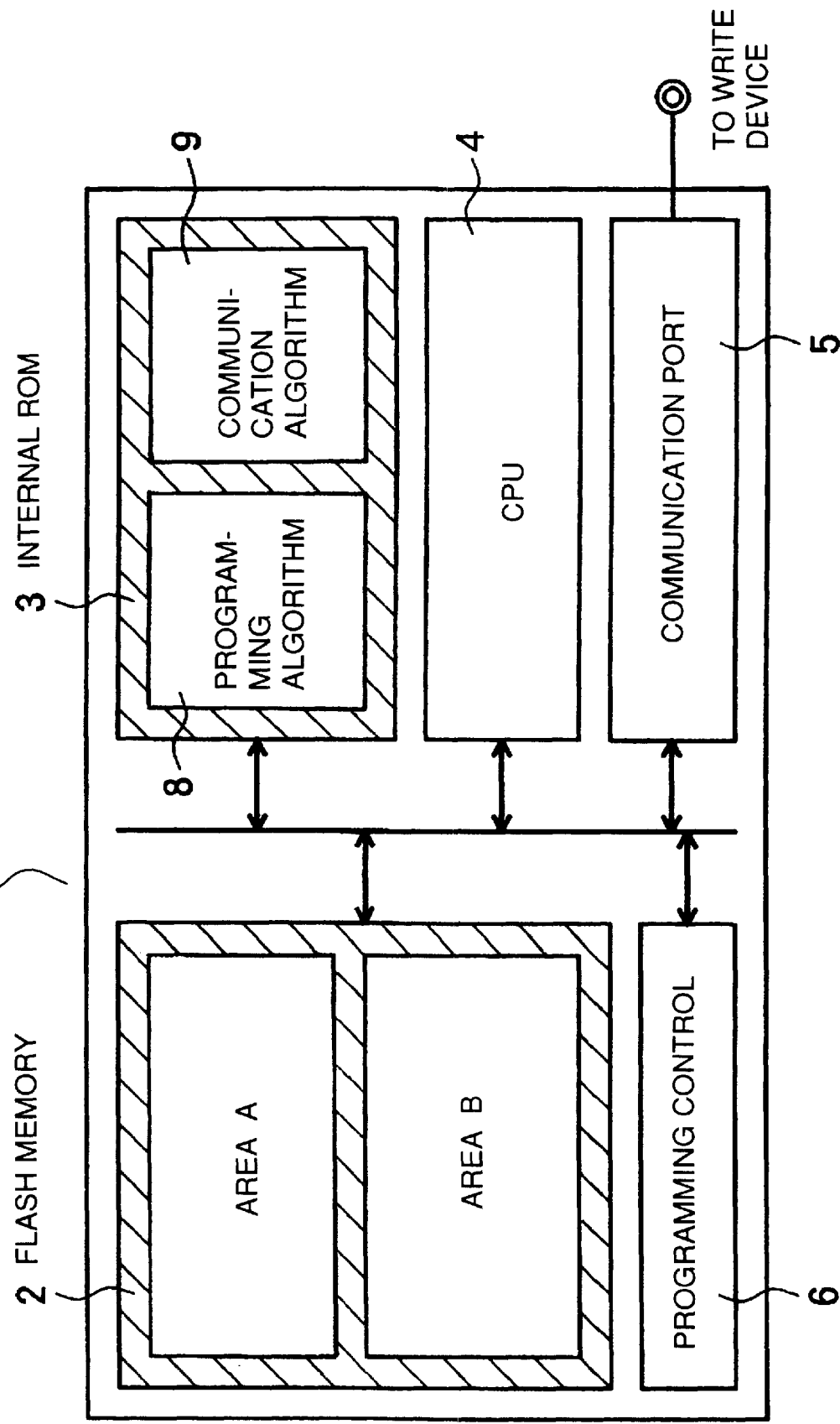
FIG. 1 is a block diagram of a single chip microcomputer having no security measure.
Figure 2:
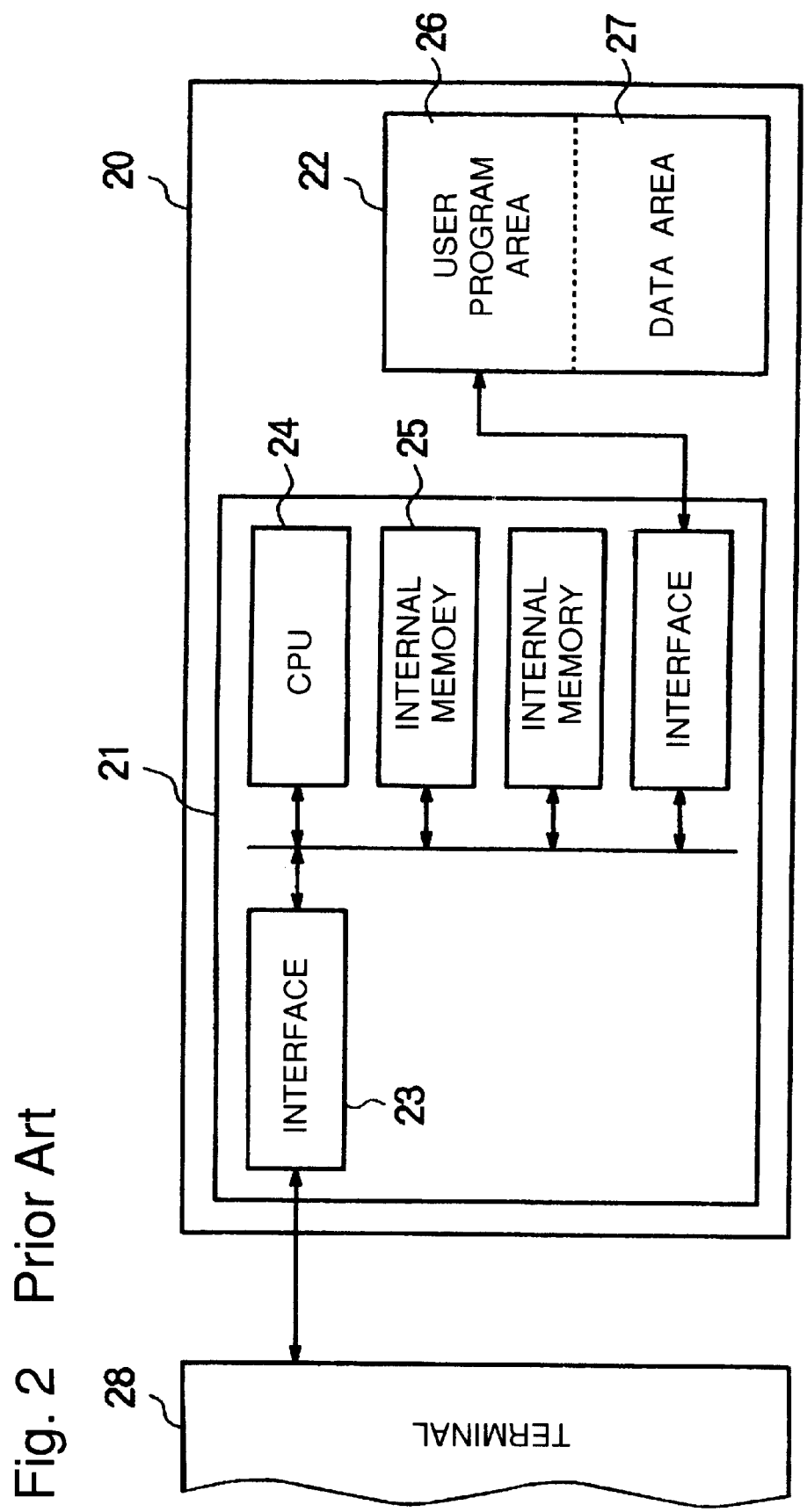
FIG. 2 is a block diagram of an IC card in the prior art.
Figure 3:
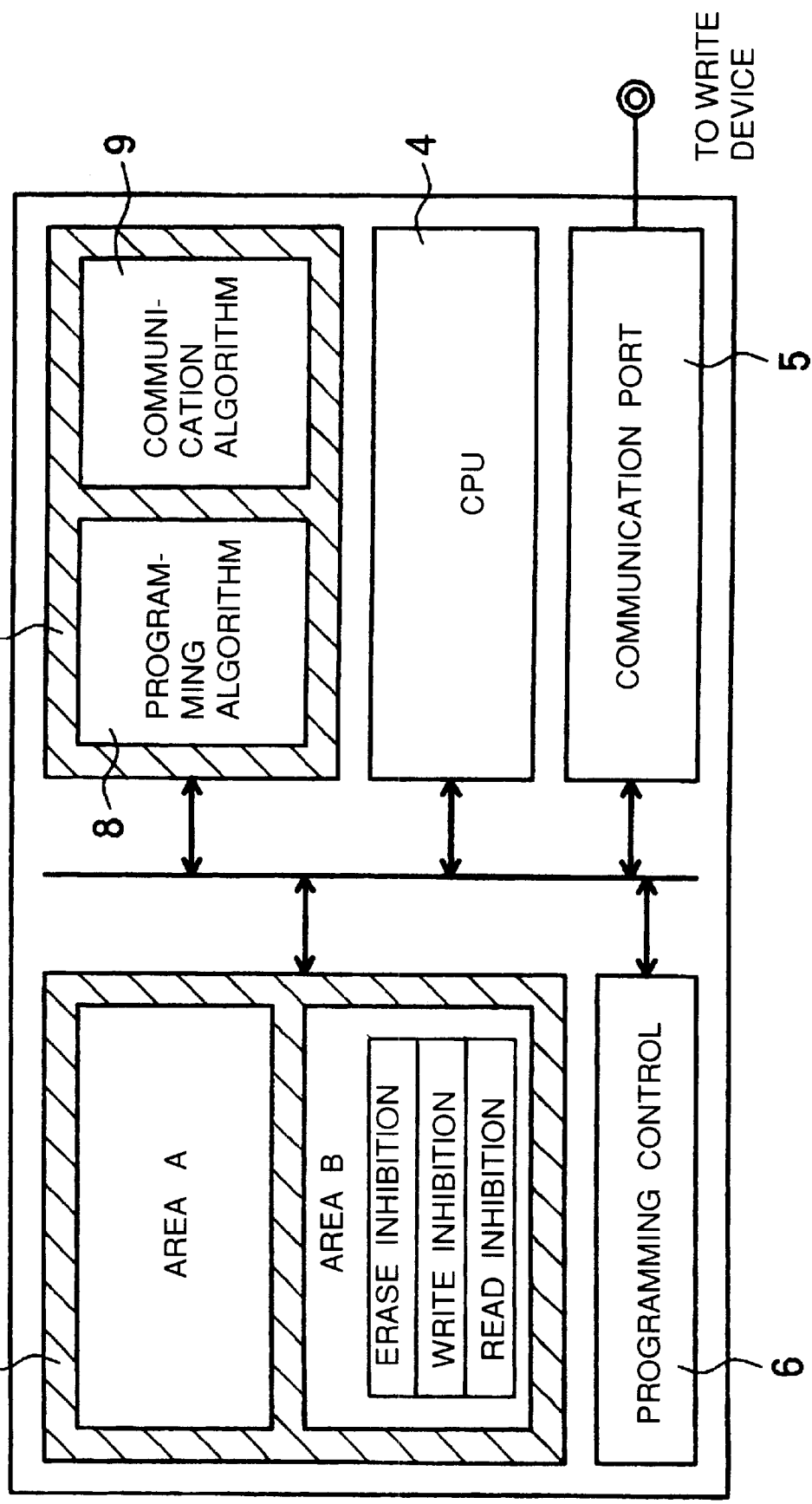
FIG. 3 is a block diagram of a first embodiment of the single chip Microcomputer in accordance with the present invention.

Referring to FIG. 3, there is shown a block diagram of a first embodiment of the single chip microcomputer in accordance with the present invention. The shown single chip microcomputer internally includes a flash memory 2, an internal ROM 3, a CPU 4, a communication port 5, and a programming control circuit 6, all of which are formed on a single chip, and which are coupled through an internal bus as shown in FIG. 3.

The flash memory 2 is previously divided into an area A and an area B which includes a write inhibition flag, a read inhibition flag and an erase inhibition flag, which are management information for managing the first area A. In other words, the area A and the area B are constituted as a paired area. The flash memory 2 includes a plurality of paired areas similar to the paired area of the area A and the area B.

The internal ROM 3 previously stores a communication algorithm 9 which describes the procedure for transferring information through the communication port 5, and a programming algorithm 8 which describes the procedure for performing the writing, the reading and the erasing to an arbitrary area in the flash memory 2.

The CPU 4 manages the whole of the single chip microcomputer 1, and executes a processing based on a program included in the internal ROM 3 or the flash memory 2. The communication port 5 is connected to an external write device (not shown) for transferring various information including a write data and a dedicated command. The programming control circuit 6 is controlled by the CPU 4 to execute the actual writing, reading and erasing to the flash memory 2.

In an initial condition, respective memory cells included in the flash memory 2 holds "1" which is an erased condition. The CPU 4 transmits or receives information to or from an external device through the communication port 5 in accordance with the communication algorithm. Furthermore, when the information from the external write device is an instruction for indicating the writing, reading or erasing to the area A in the flash memory 2, the CPU 4 refers to the corresponding flag in the area B in accordance with the programming algorithm 8, and controls the programming control circuit 6 to perform a programming operation to the area A if the programming operation is not inhibited.

When the programming operation is the erasing operation, the CPU 4 refers to the erase inhibition flag in the area B. If the erase inhibition flag is "0" which indicates the erase inhibition, the CPU refuses the erasing operation. If the erase inhibition flag is "1" which indicates the erase permission, the CPU 4 controls the programming control circuit 6 in accordance with the programming algorithm 8, to cause the programming control circuit 6 to execute the erasing operation for the area A.

When the programming operation is the writing operation, the CPU 4 refers to the write inhibition flag in the area B. If the write inhibition flag is "0" which indicates the write inhibition, the CPU refuses the writing operation. If the write inhibition flag is "1" which indicates the writing permission, the CPU 4 controls the programming control circuit 6 in accordance with the programming algorithm 8, to cause the programming control circuit 6 to execute the writing operation for the area A.

When the programming operation is the reading operation, the CPU 4 refers to the read inhibition flag in the area B. If the read inhibition flag is "0" which indicates the read inhibition, the CPU refuses the reading operation. If the read inhibition flag is "1" which indicates the reading permission, the CPU 4 controls the programming control circuit 6 in accordance with the programming algorithm 8, to cause the programming control circuit 6 to execute the reading operation for the area A.

In the above mentioned embodiment, the programming operation to the flash memory can be easily inhibited and permitted in units of area.

Figure 4:
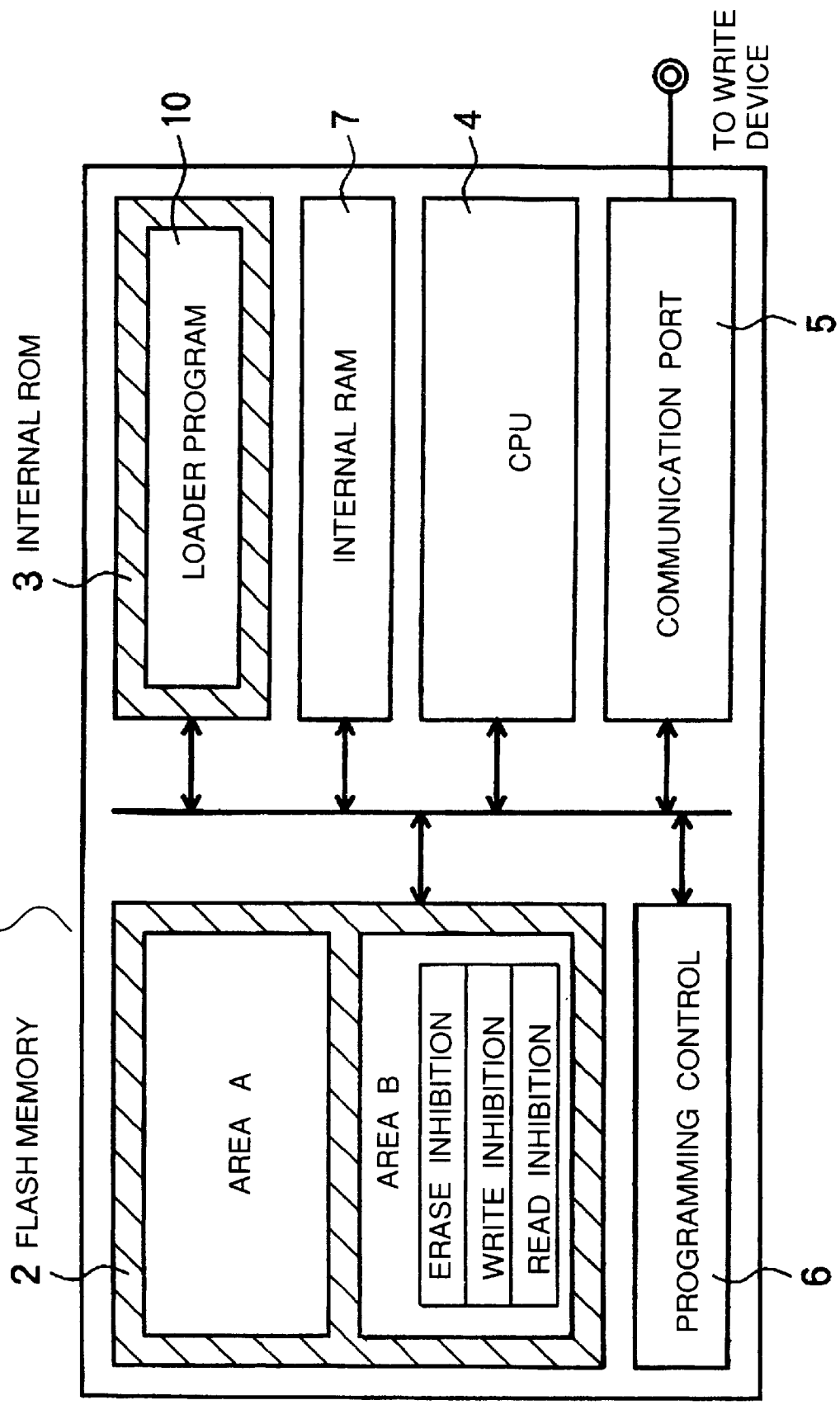
FIG. 4 is a block diagram of a second embodiment of the single chip microcomputer in accordance with the present invention.

Referring to FIG. 4, there is shown a block diagram of a second embodiment of the single chip microcomputer in accordance with the present invention. This second embodiment is different from the first embodiment in that the single chip microcomputer internally includes an internal RAM (random access memory) 7.

The internal ROM 3 previously stores a loader program 10 for downloading a communication algorithm and a programming algorithm to the internal RAM 7 through the communication port 5 from an external device.

In an initial condition, respective memory cells included in the flash memory 2 holds "1" which is an erased condition. The CPU 4 executes the loader program 10 previously stored in the internal ROM 3, to download the communication algorithm and the programming algorithm to the internal RAM 7 through the communication port 5. Thereafter, in accordance with the communication algorithm 9 stored in the internal RAM 7, the CPU 4 transfers and receives information to and from an external device through the communication port 5.

When the information received from the external device is a programming operation such as the writing, reading and erasing to the area A in the flash memory 2, the CPU 4 operates in accordance with the programming algorithm stored in the internal RAM 7, to refer to the corresponding flag in the area B and to control the programming control circuit 6 so as to perform the programming operation to the area A if the programming operation is permissible. Since the programming operation of the writing, reading and erasing is the same as that in the first embodiment, explanation will be omitted.

Generally, the internal ROM 3 is formed of a mask ROM. Therefore, the second embodiment can versatilely comply with a case that it becomes necessary to modify or change a programming algorithm and a communication algorithm, because of an application program being used, after the single chip microcomputer has been produced.

The single chip microcomputer of the above mentioned first and second embodiments, has, in addition to the above mentioned algorithms, a test mode for bringing the whole of the flash memory 2 into an erased condition. This lest mode is used for erasing the whole of the flash as,memory as a default, when the single chip microcomputer is shipped as a product.

As seen from the above, according to the present invention, the inhibition and permission of the programming operation of the writing, reading and erasing can be managed in units of area which is freely set in the flash memory. Therefore, it is possible to prevent violation to the copy right, typified by a modification and analysis of a program by an unauthorized person. In addition, since the inhibition and the permission can be clearly indicated in units of area managed, it is possible to manage by dividing into a plurality of units.

The invention has thus been shown and described with reference to the specific embodiments. However, it should be noted that the present invention is in no way limited to the details of the illustrated structures but changes and modifications may be made within the scope of the appended claims.

What is claimed is:

1. A single chip microcomputer comprising:
   a microprocessor and a flash memory both formed on a single chip,
   said flash memory including a first area, and a second area,
   said second area containing information that designates whether or not it is permissible to program said first area,
   said microprocessor being operative in response to a request from an external device to program said first area, to refer to said second area to determine whether or not a programming of said first area should be executed.

2. A single chip microcomputer claimed in claim 1 wherein, after said microprocessor has executed a programming of said first area, said microprocessor writes an instruction inhibiting further programming of said first area, into said second area.

3. A single chip microcomputer claimed in claim 2, further internally including a read only memory which stores a programming algorithm for said flash memory, and wherein said microprocessor is controlled in accordance with said programming algorithm stored in said read only memory to refer to said second area.

4. A single chip microcomputer claimed in claim 2, further internally including a read only memory which stores a loader program, and wherein said microprocessor is controlled in accordance with said loader program stored in said read only memory to refer to said second area.

5. A single chip microcomputer claimed in claim 1, further internally including a read only memory which stores a programming algorithm for said flash memory, and wherein said microprocessor is controlled in accordance with said programming algorithm stored in said read only memory to refer to said second area.

6. A single chip microcomputer claimed in claim 1, further internally including a read only memory which stores a loader program, and wherein said microprocessor is controlled in accordance with said loader program stored in said read only memory lo refer to said second area.

7. A single chip microcomputer comprising:
   a microprocessor and a flash memory both formed on a single chip,
   said flash memory including a first area, and a second area,
   said second area containing flag information that designates whether or not it is permissible to program said first area,
   said microprocessor being operative in response to a request from an external device to program said first area, to refer to said flag information in said second area to determine whether or not a programming of said first area should be executed.

8. A single chip microcomputer comprising:
   a microprocessor and a flash memory both formed on a single chip,
   said flash memory including a plurality of first areas, and a plurality of second areas,
   each of said second areas being associated with one of said first areas, and
   containing information that designates whether or not it is permissible to program said associated first area,
   said microprocessor being operative in response to a request from an external device to program one of said first areas, to refer to an associated second area to determine whether or not a programming of said first area should be executed.

9. A single chip microcomputer claimed in claim 8 wherein, after said microprocessor has executed a programming of one of said first areas, said microprocessor writes information into the associated second area inhibiting further programming of said first area.

10. A single chip computer claimed in claim 9, further including an internal read only memory which stores a programming algorithm for said flash memory, and wherein said microprocessor is controlled in accordance with said programming algorithm stored in said read only memory when programming of a first area has been requested, to refer to said associated second area.

11. A single chip microcomputer claimed in claim 9, further including an internal read only memory which stores a loader program, and wherein said microprocessor is controlled in accordance with said loader program stored in said read only memory when programming of a first area has been requested, to refer to said associated second area.

12. A single chip microcomputer claimed in claim 8, further including an internal read only memory which stores a programming algorithm for said flash memory, and wherein said microprocessor is controlled in accordance with said programming algorithm stored in said read only memory when programming of a first area has been requested, to refer to said associated second area.

13. A single chip microcomputer claimed in claim 8, further including an internal read only memory which stores a loader program, and wherein said microprocessor is controlled in accordance with said loader program stored in said read only memory when programming of a first area has been requested, to refer to said associated second area.

14. A single chip microcomputer claimed in claim 8 wherein said information stored in each of said second areas comprises a flag indicating whether or not programming of the associated first area is permissible.

\* \* \* \* \*